Dec. 31, 1935.  C. E. WHITE  2,026,112
HAY RAKE
Filed April 5, 1935
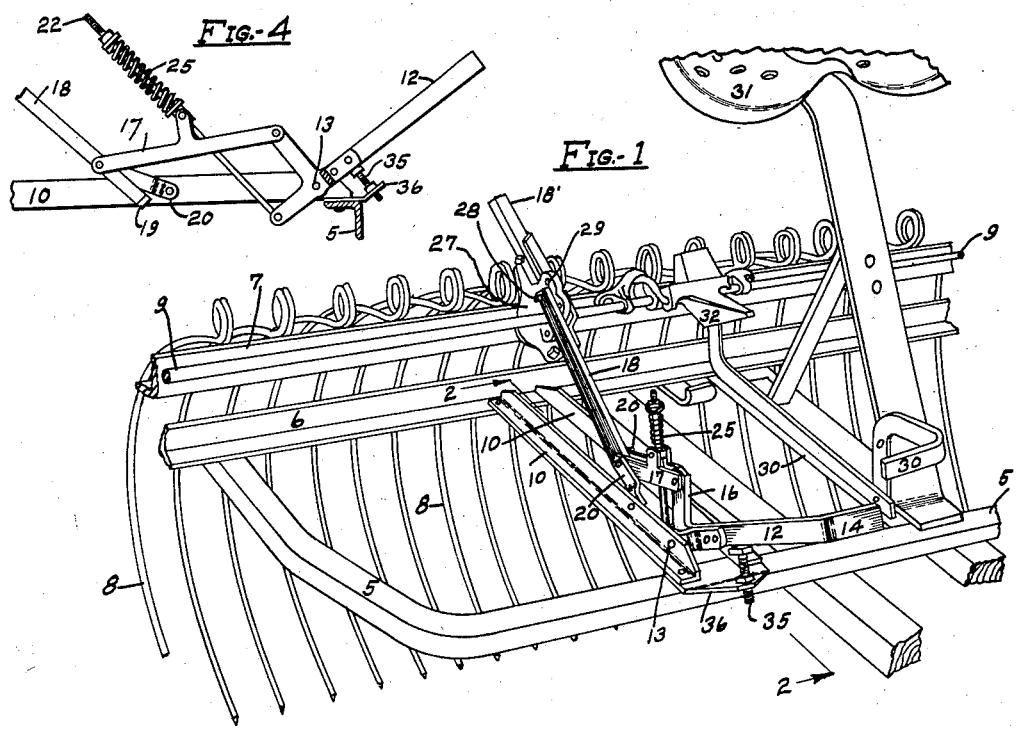
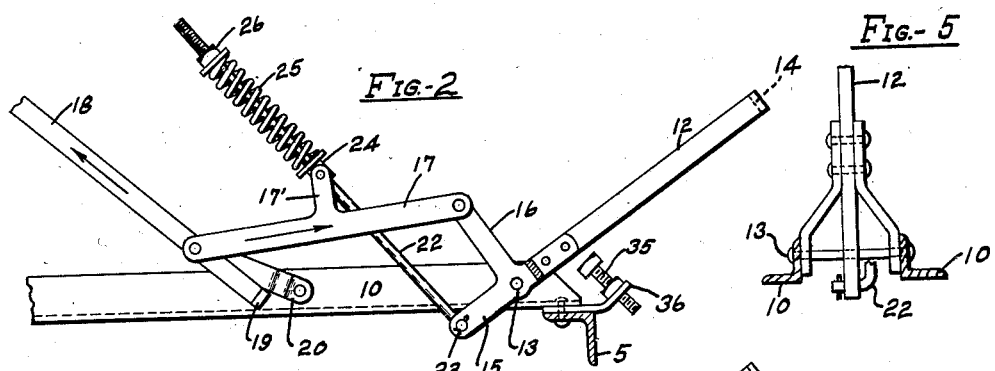
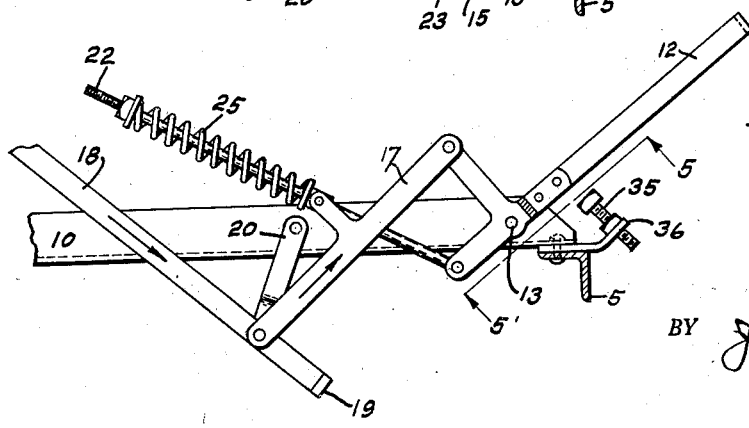
INVENTOR.
CARL E. WHITE
BY James A. Walsh,
ATTORNEY.

Patented Dec. 31, 1935

2,026,112

UNITED STATES PATENT OFFICE 2,026,112

HAY RAKE

Carl E. White, Rockford, Ill., assignor to J. I. Case Company, Racine, Wis., a corporation Application April 5, 1935, Serial No. 14,744

5 Claims. (Cl. 56—391)

The object of my invention is to simplify and improve the construction and operation of self-dumping hay rakes of the character disclosed in the Rutter Patent No. 1,947,572, issued February 20, 1934, which improvements consist in certain details of construction and arrangements of parts under ready control of the operator, as will further appear.

In the accompanying drawing, forming part hereof, Figure 1 is a fragmentary perspective of that portion of the rake which includes said improvements; Figs. 2, 3, and 4, detail views of the lever mechanisms for controlling the movements of the rake-head, as seen when looking in the direction of the arrows 2—2 in Fig. 1; and Fig. 5 is a view taken on the dotted lines 5—5 in Fig. 3.

In the drawing, the numerals 5, 6, indicate the draft frame, of any desired construction and arrangement, the usual stripper fingers being omitted, and upon which frame a rake-head 7 having teeth 8 is pivotally mounted, as is common, the rake-head carrying pawl shafts 9 the outer ends of which are adapted to engage the hubs of the carrying and drive wheels (not shown) in a well known manner and as indicated in said patent.

In Fig. 1 the implement is shown in raking and loading position, the frame thereof embodying struts 10 constituting a sub-frame on which a lever 12 is pivotally mounted, at 13, said lever having a transverse treadle 14 at its forward end, an extension member 15 at its rear end, and a laterally extending arm 16 connected by links 17 to a presser-bar 18 having a stop-block 19 at its lower end adapted to engage a coupling-bar 20 connecting said presser-bar and the sub-frame 10. To the lever extension 15 an adjusting screw 22 is pivotally connected, at 23, and extends between the links 17, being pivotally connected to clevis straps 17' thereon by a trunnion 24 which serves as a stop for a compression spring 25 the opposite end of which engages a nut 26 on the upper threaded end of the rod 22.

The linkage and leverage system thus described in connection with the sub-frame 10, it will be understood, may be assembled as a unit to be installed upon or removed from the frame 5, 6, the upper end of the bar 18 being adjustably connected to the bracket 27 on the rake-head by a pin 28 and a series of holes 29, and to which bracket a hand-lever 18' is secured, which, when forced forwardly and downwardly in the direction of the linkage system, will rock the rake-head 7 to raise its teeth and maintain the latter in such position for transportation, when said lever has been anchored, in a well known manner. When a load has been raked and ready to be dumped the treadle 12 is released and a trip-lever 30 depressed by an operator on seat 31, which trip-lever is pivotally connected to a trip-plate 32 for operating associated parts and the pawl shafts 9, as fully described in the patent referred to, for raising the rake-head, during which movement of the latter the spring 25 gradually distends and the linkages assume the position indicated in Fig. 3, and as said parts are moving into such position the rake-head is assisted in its upward movement by the energy of the spring. As indicated in Fig. 1, the teeth 8 are in raking or loading position, and may be brought into fixed relation to the earth by pressing treadle 14, which downward movement, as well as the complete downstroke of the teeth from their raised position, is controlled by the linkages as they are assuming the position shown in Fig. 2, during which movement spring 25 gradually compresses between stop 24 and nut 26, which action retards the fall of the descending teeth 8, and which will be held in down position without the use of locking means, as the stop-block 19 on bar 18 will contact the coupling 20 and prevent said bar from coming into longitudinal alignment with the coupling.

In field work it becomes necessary to draw the rake over hummocks or other ground irregularities with the teeth in gathering or down position when the elements of the linkage system have normally assumed the relation indicated in Fig. 2, with the stop 19 engaging coupling 20, in which manner the teeth would be maintained in fixed position. However, in order to provide for flexibility of the teeth in such circumstances I employ an adjusting device 35 mounted on the forward frame, at 5, by means of a keeper 36 or otherwise, which, when adjusted to contact with lever 12, as shown in Fig. 4, disengages the stop 19 from coupling 20, so that when the rake is moving over bumpy ground the unlocked linkage will permit the rake-head to freely rock, and consequently the ends of the teeth will follow irregularities of the ground, but when such condition does not exist the device 35 may be readjusted to the position shown in Fig. 2 so that bar 18 and coupling 20 will be engaged in substantially locked condition.

From the foregoing description it will be understood that the operation of the rake-head may be controlled in a simple manner by mechanism constituting a linkage system centralized on the rake frame to be actuated by an attendant on the implement, or which latter may be drawn by a tractor and the parts thereof controlled by the operator in a convenient manner.

I claim as my invention:

1. In a hay rake, a frame, a toothed rake-head rockingly supported on the frame, means for rocking the rake-head comprising a presser-bar connected thereto, means connecting the bar and frame, a lever mounted on the frame having a rear extension and a laterally extending arm, a link connecting the arm and bar, a tension-rod connecting the lever extension and link, and adjusting means on the frame engageable with the lever for maintaining the bar and the means connecting the bar and frame in disengaged relation when the lever is actuated.

2. In a hay rake, a frame, a toothed rake-head rockingly supported on the frame, a presser-bar connected to the rake-head, a coupling connecting the bar and frame, a lever mounted on the frame having a laterally extending arm, a link connecting the arm and bar, means for actuating the lever, link and bar for rocking the rake-head to raise and lower the teeth thereof, and yielding means connecting the lever and link for retarding the descent of the rake-head teeth when the lever, link and bar are actuated.

3. In a hay rake, a frame, a toothed rake-head rockingly supported on the frame, a presser-bar connected to the rake-head, a coupling connecting the bar and frame, a lever mounted on the frame, a link connecting the lever and bar, said bar, coupling, lever and link constituting a linkage system, means for actuating said linkage system, and yielding means connecting the lever and link for controlling the descent of the rake-head teeth when the linkage system is actuated.

4. In a hay rake, a frame, a toothed rake-head rockingly supported on the frame, a presser-bar connected to the rake-head, means connecting said bar and frame, a lever mounted on the frame, a linkage connecting the bar and lever, said bar, connecting means, lever and linkage constituting a linkage system, means for actuating said linkage system, and adjusting means on the frame engageable with the lever for controlling the position of the bar said bar in relation to the means connecting it to the frame when the linkage is actuated.

5. In a hay rake, a frame, a toothed rake-head rockingly supported on the frame, a presser-bar connected to the rake-head, means connecting said bar to the frame, a lever mounted on the frame, a link connecting the bar and lever, said bar, connecting means, lever and link constituting a linkage system, means for actuating the linkage system, a clevis-strap associated with the link, and a tension-rod connected to the lever and clevis-strap for controlling the descent of the rake-head teeth when said linkage system is actuated.

CARL E. WHITE.